(12) United States Patent
Dallapiazza

(10) Patent No.: US 7,347,913 B2
(45) Date of Patent: Mar. 25, 2008

(54) SEALING APPARATUS AND METHOD

(75) Inventor: Joseph Dallapiazza, Rochester Hills, MI (US)

(73) Assignee: Fenwal, Inc., Lake Zurich, IL (US)

( * ) Notice: Subject to any disclaimer, the term of this patent is extended or adjusted under 35 U.S.C. 154(b) by 467 days.

(21) Appl. No.: 10/475,767

(22) PCT Filed: Apr. 9, 2002

(86) PCT No.: PCT/US02/11148

§ 371 (c)(1),
(2), (4) Date: Jul. 2, 2004

(87) PCT Pub. No.: WO02/087491

PCT Pub. Date: Nov. 7, 2002

(65) Prior Publication Data

US 2005/0000640 A1 Jan. 6, 2005

Related U.S. Application Data

(60) Provisional application No. 60/287,027, filed on Apr. 27, 2001.

(51) Int. Cl.
*B65B 7/14* (2006.01)
(52) U.S. Cl. ............... 156/199; 156/196; 156/443; 156/459; 156/461; 156/463; 156/583.1; 53/477; 53/479; 53/476; 604/410
(58) Field of Classification Search ............... None
See application file for complete search history.

(56) References Cited

U.S. PATENT DOCUMENTS

| | | | |
|---|---|---|---|
| 2,940,230 A | 6/1960 | Flax | |
| 4,363,205 A | 12/1982 | Hollander | |
| 4,496,819 A * | 1/1985 | Acker et al. | 219/769 |
| 5,394,907 A | 3/1995 | Hjertman et al. | |
| 5,750,971 A | 5/1998 | Taylor | |
| 5,834,660 A | 11/1998 | Whalen et al. | |

OTHER PUBLICATIONS

PCT/US02/11148, Aug. 6, 2002, Baxter International Inc.
PCT/US02/11148, Jun. 19, 2003, Baxter International Inc.
Segmentation System Literature, no date.
Tube Sealers—Brochures by Sebra, no date.
Hematron II—Ancillary Products Brochure, Baxter Healthcare Corporation, Fenwal Division, 1999.
AutoSeal Tube Sealer Brochure, Baxter Healthcare Corporation, Fenwal Division, 2000.
Handy Seal Tube Sealer Brochure, Baxter Healthcare Corportation, Fenwal Division, 2000.
Hematron III Tube Sealer—Brochure, Baxter Healthcare Corporation, Fenwal Division 2000.
Genesis Tube Sealers (2 pages); Genesis BPS; Hackensack, NJ, no date.

* cited by examiner

*Primary Examiner*—Jessica Ward
(74) *Attorney, Agent, or Firm*—Cook, Alex, McFarron, Manzo, Cummings & Mehler, Ltd.

(57) ABSTRACT

Apparatus (20) and methods for segmenting a blood-filled tube (42) into multiple, blood-containing, sealed segment are disclosed. The apparatus (20) includes a tubing locating surface (22) for mounting the tubing and sealing means (24) cooperatively associated with the tubing locating surface (22).

3 Claims, 4 Drawing Sheets

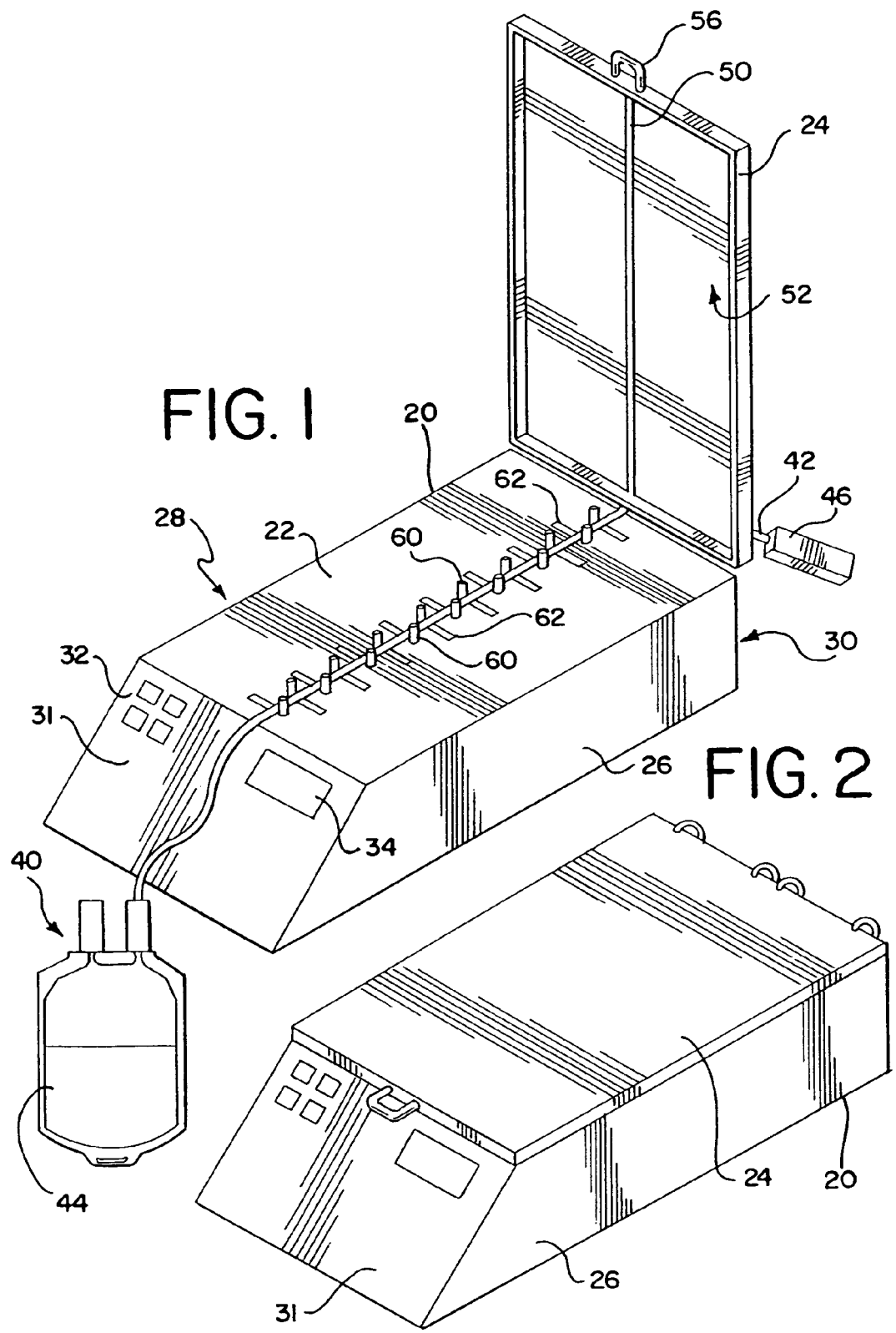

SEALING APPARATUS AND METHOD

CROSS-REFERENCE TO RELATED APPLICATION

This application claims the benefit of U.S. Provisional Patent Application Ser. No. 60/287,027, filed Apr. 27, 2001.

FIELD OF THE INVENTION present invention relates generally to the field of blood donation and collection, and to apparatus and methods for providing multiple blood samples of the donated blood. More particularly, the present invention relates to apparatus and methods for sub-dividing a blood-containing plastic tube to provide multiple, blood-containing, tubing segments.

BACKGROUND

In a typical blood donation procedure, blood is collected from a donor using a plastic, disposable blood collection kit. In its most basic form, the blood collection kit includes a venipuncture needle, one or more plastic collection containers and a length of plastic tubing connected to the needle and the container(s) to provide a flow path therebetween. After collection, the blood may be further processed or stored until it is ready to be transfused to a patient.

Before it is used, however, the collected blood must be tested to establish compatibility with the patient's (recipient's) blood type (e.g. A, B, AB, O) and/or possibly for other purposes as well. Thus, samples of the donated blood must be collected for the required testing. The blood that remains in the plastic tubing after the blood donation may be used for such samples.

Recently, sealing devices have been developed to allow the plastic tubing to be sealed into one or more blood-containing segments. The segmented tubing portions can then be separated from the rest of the tube by cutting or tearing at the seal line. The blood in the detached segments can then be used for the tests that may be required. Presently, it is common to prepare up to as many as 16 separate blood-containing tubing segments which can then be used for the required tests.

The sealing devices currently in use operate on the principle of heat-sealing. The device typically includes a sealing head with heatable jaws for compressing the tubing. The tubing is captured within a slot between the jaws, which compress the wall of the tubing, melts and fuses it.

There are many commercially available sealing devices. One such sealing device is the Hematron II available from Baxter Healthcare Corporation of Deerfield, Ill. The Hematron II is a portable, dielectric sealing device that includes a single sealing head. Multiple tubing segments can be provided by manually advancing the tube through the sealing head and sealing the tubing at the desired locations.

Another manufacturer of sealing devices is Starstedt of Newton, N.C. which provides a stationary device (as contrasted to a hand-held device of the type described below). Several modules of this device, each having a single sealing head, can be placed in a series to provide multiple (up to 6) seals in the tubing.

More recently, hand-held sealing devices have been introduced. Examples of such hand-held devices include the Auto-Seal, Handy-Seal and the Hematron III, all available from Baxter Healthcare Corporation. Other hand-held and/or stationary devices are available from other suppliers/manufacturers.

Although the devices currently available have generally worked satisfactorily, further improvements in the field of sealing blood tubing are desirable. For example, the sealing devices described above require either manual location of the tubing in the sealing head, manual movement or advancement of the tubing between the sealing heads or the combination of multiple sealing heads (which require greater energy, resulting in increased cost of the device).

Thus, it would be desirable to provide a sealing device that limits the amount of manual involvement and quickly provides the required number of tubing segments. It would also be desirable to provide a low-cost, energy efficient apparatus.

SUMMARY

In one aspect, the present invention is directed to an apparatus for providing multiple tubing segments. The apparatus includes a tubing locating surface for placing a length of blood-containing tubing thereon. The apparatus also includes sealing means cooperatively associated with the tubing locating surface for concurrently providing multiple, sealed, blood-containing tubing segments.

In another aspect, the present invention is directed to a method for providing multiple, sealed, blood-containing, tubing segments. The method includes providing a length of blood-containing tubing, mounting the tubing on a tubing locating surface. The method further includes sealing the tubing to concurrently provide a plurality of sealed, blood-containing, tubing segments.

BRIEF DESCRIPTION OF THE DRAWINGS

FIG. 1 is a perspective view of an apparatus embodying the present invention including a blood tubing mounted thereon;

FIG. 2 is a perspective view of the apparatus of FIG. 1 with a sealing means in a closed position;

DESCRIPTION OF THE PREFERRED EMBODIMENTS

Figure 4:
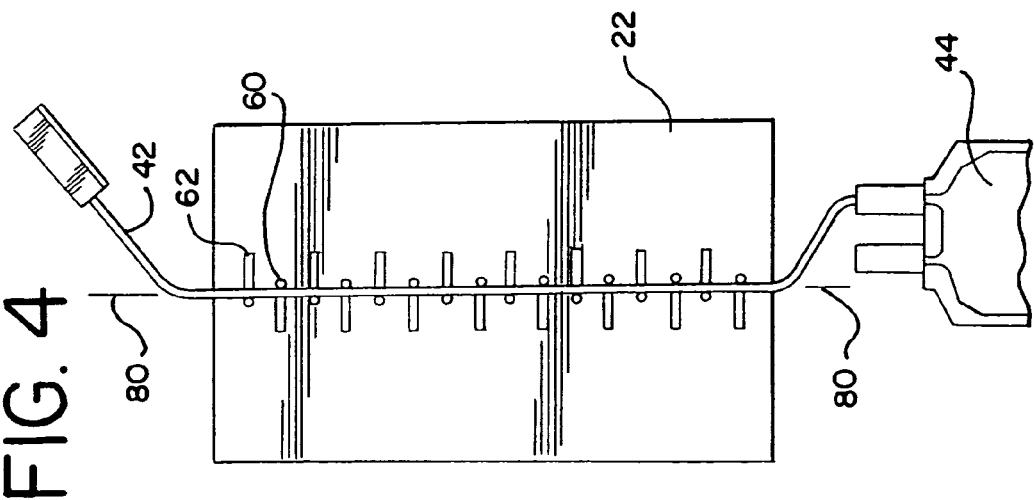
FIG. 4 is a top view of the tubing locating surface of the apparatus of FIG. 1, prior to movement of the pins.

Referring to FIG. 1, one embodiment of the present invention is found in a sealing apparatus 20 embodying the present invention. Apparatus 20 includes a tubing locating surface 22 and a "sealing means." The tubing locating surface 22 can be any surface that is adapted to receive a length of tubing 42 whereon, if desired, the tubing can be configured in a particular shape. The surface may be flat and provided with means for configuring the tubing, as described in more detail below. The "sealing means" are cooperatively associated with the tubing locating surface 22 by physical attachment to the surface and/or by relative movement to the surface.

In the example of FIG. 1, the tubing locating surface 22 is a flat platform and the "sealing means" is embodied in cover 24. Sealing apparatus 20 may also include side walls 26 and 28, end wall 30 and a front panel 31. Front panel 31 may further include a key pad 32 and a display screen 34 to allow for operator control of and interface with apparatus 20. The interior of apparatus 20 houses the necessary electrical and mechanical components required to operate apparatus 20, which will be apparent to those of skill in the art.

Also shown in FIG. 1 is a basic blood collection kit 40. Blood collection kit 40 includes a length of tubing 42, one end of which is attached to collection container 44. The other end of tubing 42 is attached to a venipuncture needle (not shown). After a blood donation, the venipuncture needle is retracted and housed in a needle protector 46. Apparatus 20 is adapted to receive a blood collection kit 40 by mounting or otherwise placing tubing 42 on tubing locating surface 22. Of course, it will be appreciated that apparatus 20 is not limited to use with the particular blood donation kit 40 shown in the Figures, and that other configurations of blood-containing tubing (e.g., tubing from other blood processing/collection kits) may be mounted in and used with apparatus 20.

As noted above and shown in FIG. 1, apparatus 20 include a "sealing means." In one embodiment, sealing means may be a cover 24 which includes a sealing element such as sealing bar 50 located in the interior cavity 52 of cover 24. The sealing bar 50 may be a bar made of metal or other heatable material. In a preferred embodiment of the present invention, apparatus includes a single sealing element, such as sealing bar 50. A single sealing element requires less energy and, thus, reduces the overall cost of apparatus 50 (as compared to a device with multiple sealing heads). Although an apparatus with a single sealing element may be preferred, it will be understood that the present invention is not limited to such apparatus and examples of apparatus with multiple sealing elements are described below.

Figure 3:
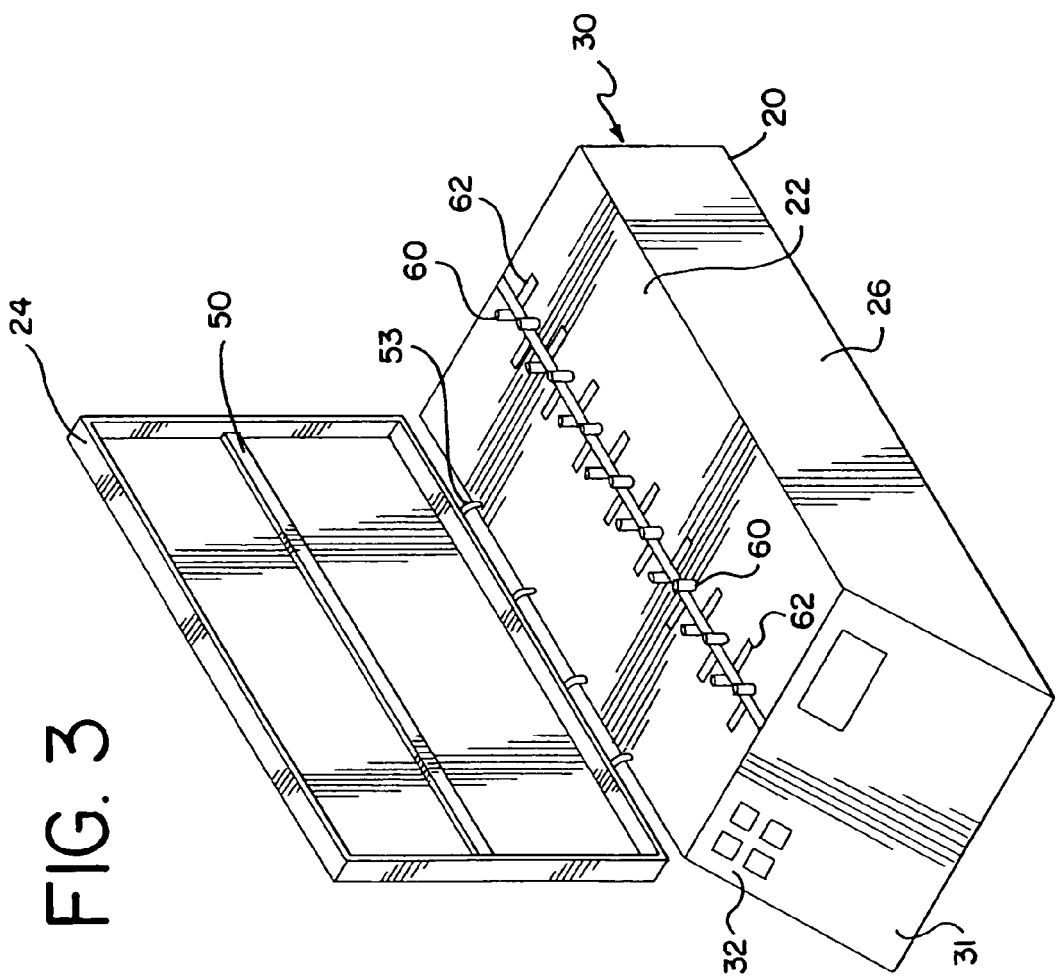
FIG. 3 is a perspective view of another apparatus embodying the present invention.

As further shown in FIG. 1, cover 24 is cooperatively associated with apparatus 20. For example, cover 24 can be attached to the apparatus 20 with hinges 53 to the end wall 30 of apparatus 20. Alternatively, cover 24 may be cooperatively associated with apparatus 20 by hinges attached to side wall 28 of apparatus 20, as shown in FIG. 3. Cover 24 may further include a handle 56 to allow the operator to grasp the cover 24 during the sealing step, described in more detail below.

It will be appreciated that the sealing means need not be a hinged cover (as shown in the Figures) and that other embodiments of the sealing means are also possible and are within the scope of the present invention. For example, the sealing means may be a plate or rack adapted for vertical movement relative to or placement on tubing locating surface 22. In addition, the cover, plate or rack can either partially or fully cover tubing locating surface 22. The plate or rack can have a sealing element facing the tubing locating surface as generally described above. The plate or rack can be manually operated by the technician or automatically operated by a microprocessor associated with apparatus 20 under the control of the technician.

Apparatus 20 may further allow for configuring tubing 42 in a desired configuration. In accordance with a preferred embodiment depicted in FIGS. 1 and 2, the means for configuring the tubing may be a series of pins 60 located on the tubing locating surface 22 of apparatus 20. As shown in FIG. 1, pins 60 may be located near longitudinal axis 80 of the tubing locating surface 22. As further seen in FIG. 4, in one embodiment, pins 60 may be staggered, with one pin located on one side of axis 80, and the next pin located on the opposite side of axis 80. Pins 60 reside within slots 62 which, as described in more detail below, allow for lateral movement of pins 60. Pins 60 may be cylindrical in shape or shaped with a generally concave middle or other shape (e.g., containing a lip at the side opposite surface 22) in order to better retain tubing 42.

Alternatively, the means for configuring the tubing may be a pre-defined groove in the tubing locating surface into which tubing 42 is placed. The groove may be pre-defined in the desired configuration (i.e., straight line along the axis of surface 22, wave form, zig-zag, U-shape, spiral). In still another alternative, tubing 42 can be simply configured on the tubing locating surface 22 (without pins and/or slots) and secured in the desired configuration on the tubing locating surface 42 with clips or other retainers.

Turning now to the operation of the apparatus, after blood collection, the needle is removed from the donor and retracted into protector 46. It may also be desirable to seal off a portion of the tubing 42 near protector 46 to prevent blood from being forced out the end of the needle during the sealing process. (Of course, as stated above, it will be understood that any blood-containing tubing can be used with apparatus 20).

After removal of the needle from the donor, the portion of the blood-containing tubing 42 between needle protector 46 and container 44 is mounted on tubing locating surface 22. The tubing may then be configured by any of the available means for configuration, if desired. In the preferred embodiment, tubing 42 is placed between pins 60, as shown in FIG. 4. When the operator has determined that the tubing 42 is correctly positioned between pins 60, the pins 60 may be laterally moved within slots 62.

Figure 5:
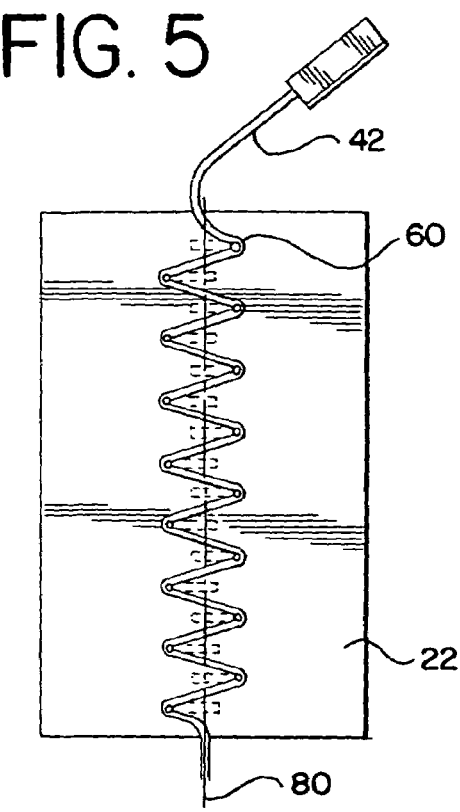
FIG. 5 is a top view of the tubing locating surface of the apparatus of FIG. 4 after movement of the pins to place the tubing in a desired configuration.

More specifically, pins 60 located near the axis 80 of the tubing locating surface 22 are moved across the axis 80 to the end of slot 62 to a position spaced from the axis 80, as shown in FIG. 5. It will be appreciated that as pins 60 move within slots 62, they move the tubing and configure it in, for example, a sine wave, as shown in FIG. 5. In a preferred embodiment, pins 60 may rotate as they move across slot 62, thereby reducing friction with the tubing and, in general, making it easier to move the tubing. Movement of the pins 60 may be manual or, more preferably, automatically effected by the apparatus 20 under the control of the operator, as by mechanical linkage and/or solenoid. Apparatus 20 may also be pre-programed to accommodate different tubing thicknesses, tubing lengths and provide variably sized tubing segments.

After the pins 60 have moved to their lateral positions spaced from the axis 80, the tubing may be sealed along the axis 80 to provide the tubing segments. As shown in FIG. 1, the cover 24 (or other sealing means) which includes the sealing bar 50 may be lowered over the tubing locating surface 22 to compress and seal the tubing at spaced locations. Thus, one of the advantages of the present invention is that by being able to configure the tubing in a particular shape, only one sealing bar is required to provide multiple, sealed tubing segments.

Figure 6:
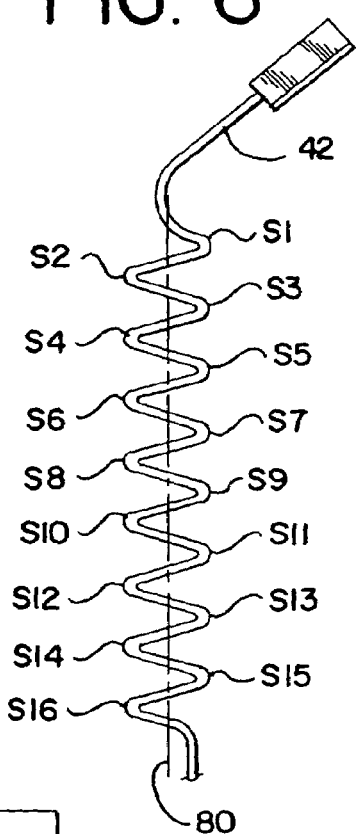
FIG. 6 is a view of the tubing after sealing showing the tubing segments (e.g., S1-S16)
Figure 7:
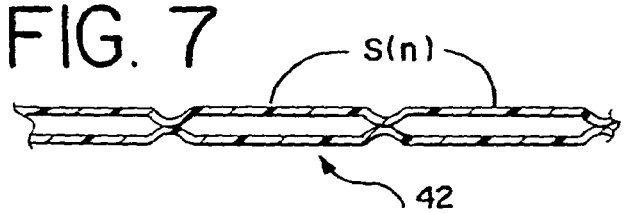
FIG. 7 is a side, cross-sectional view of a portion of the segmented tubing.

As shown in FIGS. 1 and 3, when cover 24 (or other sealing means) is lowered over the tubing locating surface 22, the sealing bar 50 (located in the interior cavity 52 of cover 24) is in line with the axis 80 of the tubing locating surface 22. Accordingly, the sealing bar 50 contacts the tubing at all points where the tubing intersects axis 80. The sealing bar 50, which, as described above, may be a heated element, associated with a source for providing energy such as, but not limited to radio frequency energy, laser energy or any other suitable form of energy. As will be appreciated by those of skill, the portion of tubing locating surface 22 where sealing bar 50 contacts the tubing should be made of a material and/or otherwise sized and shaped to allow for energy and/or current transfer from sealing bar 50. Sealing bar 50 compresses the tubing 42 at the points of intersection and seals the walls of the tubing together to form the desired segmented tube as shown, for example, in FIGS. 6 and 7. In addition, sealing bar 50 and/or the portion of tubing locating surface 22 where sealing bar 50 contacts the tubing may include ridges or be otherwise textured to provide a scored or perforated seal.

Figure 6A:
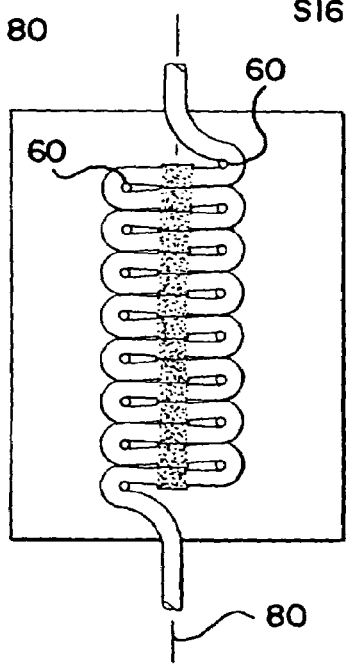
FIG. 6A is a view of the tubing after sealing that results in a packet of tubing segments.

Shown in FIG. 6A is another variant of the segmented tubing resulting from the operation of the present invention. As seen in FIG. 6A, a "packet" of tubing segments can be provided. In the embodiment shown, the seals between the segments are loosely sealed to each other to provide a compact packet of segmented tubing. The packet may be provided by reducing the spacing between the pins along the axis 80. Thus, a single sealing element 50 contacts the tubing to make the seals. The proximity of the seals to each other causes the seals to touch (during the sealing process), thereby physically joining them. The pins 60 should be spaced in such a way that detachment of adjacent seals from each other can be easily effected by the operator.

The number of segments can be adjusted by the operator as desired. In the examples shown in FIGS. 5 and 6, for example, the sealing operation results in 16 segments, S1-S16, which can then be separated by either cutting or tearing at the seal line. The separated segments can then used for the necessary testing of the blood. Of course, it will be understood that the number of desired segments is not limited to 16 and may be greater or fewer, as required.

For example, some of the pins 60 can be removed (or bypassed) to provide fewer and/or larger segments. In still another alternative, the pins may move independently, with the control system determining how many pins must be employed and/or moved based on operator input. Likewise, if smaller or more segments are desired, additional pins 60 may be added or employed. Where different means for configuring the tubing are used, such as the slot described above, apparatus may be provided with different replaceable tubing locating surfaces adapted to provide the desired number and size of the segments.

Although the preferred embodiment described above includes a tubing locating surface 22 with moveable pins 60, in another embodiment, the pins 60 may be stationary and pre-disposed in the desired configuration of the type shown, for example, in FIG. 4.

Figure 8:
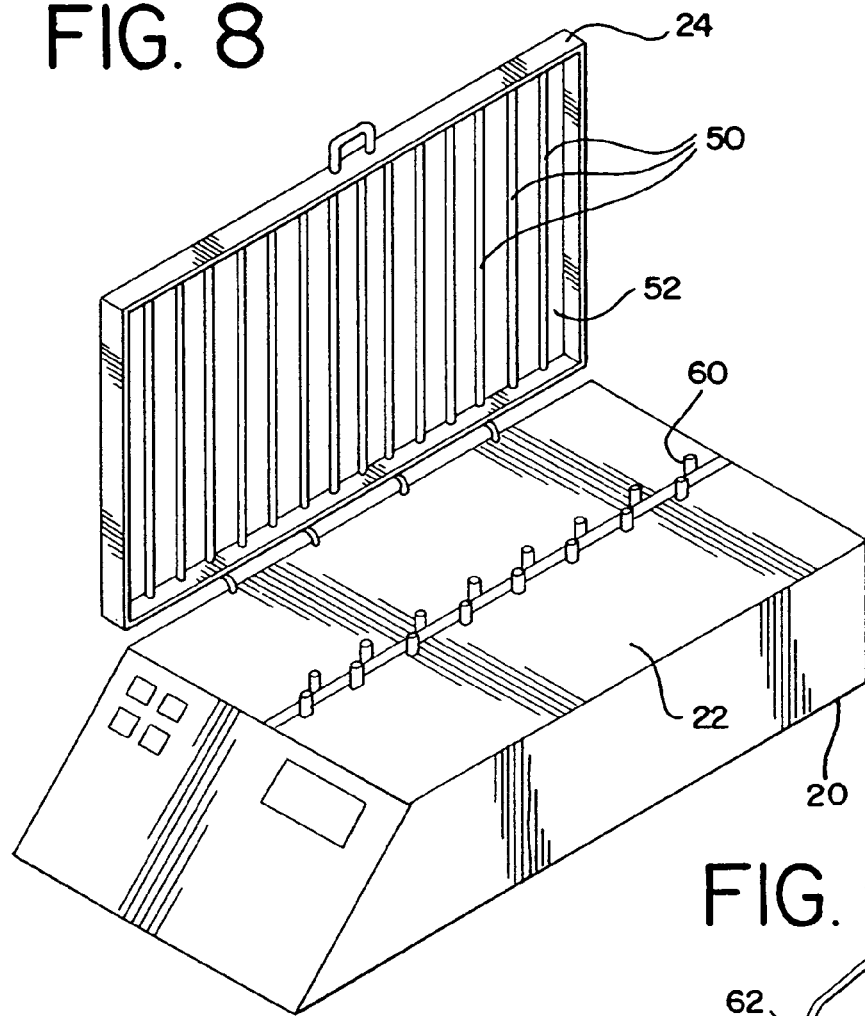
FIG. 8 is a perspective view of another apparatus embodying the present invention.
Figure 9:
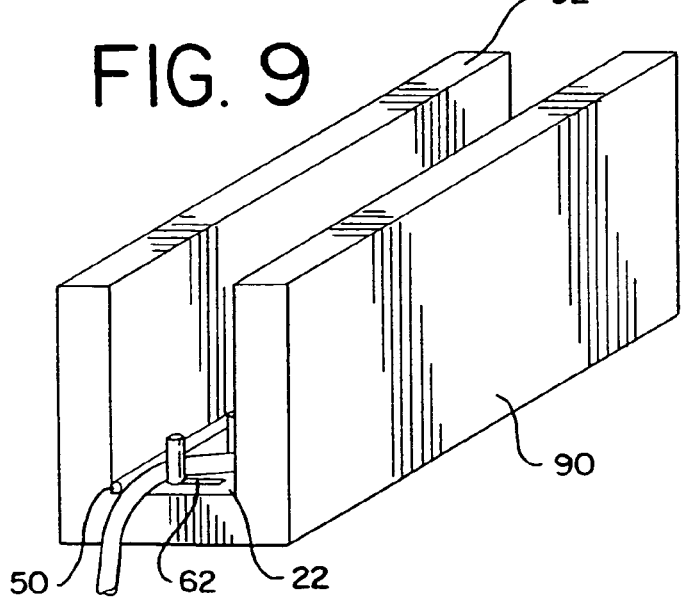
FIG. 9 is a perspective view of another apparatus embodying the present invention.
Figure 10:
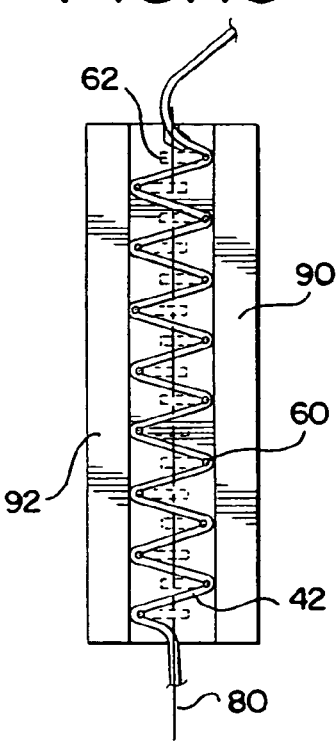
FIG. 10 is a top view of the embodiment shown in FIG. 9.

Still another alternative is shown in FIG. 8. In FIG. 8, pins 60 are not moveable, but instead are fixed substantially along the axis 80 of tubing locating surface 22. In this embodiment, cover 24 include multiple sealing elements such as sealing bars 50 transversely spaced across the interior cavity 52 of cover 24. Cover 24 may be hinged to side wall 28, or otherwise cooperatively associated with apparatus 20, as described above. When cover 24 is lowered the sealing bars 50 contact the tubing 42, which is mounted in a straight line, at multiple locations along the length of tubing 42.

It is also contemplated that other embodiments of the present invention are possible. For example, in contrast to embodiments described above wherein a sealing means, such as cover 24 is lowered over a flat, horizontal tubing locating surface 22, apparatus 20 may include a tubing locating surface 22 disposed between two side-by-side platens or surfaces 90 and 92 that are disposed at 90° to the tubing locating surface 22. These side-by-side platens may include sealing elements (bars) 50 on their interiors so that when pins 60 move the tubing, they press against the interior walls of platens 90 or 92 to seal the tubing and provide the required number of tubing segments.

The present invention has been described in the context of several possible embodiments which are offered for illustrative purposes only.

That which is claimed:

1. A method for providing multiple, sealed, blood-containing tubing segments comprising:
   providing a length of blood-containing tubing;
   mounting said tubing on a tubing locating surface having means for configuring said tubing in a desired configuration, wherein said means comprises a series of pins spaced from a longitudinal axis of said surface;
   configuring said tubing on said tubing locating surface in said desired configuration after said mounting, whereby said tubing is configured in the shape of a wave; and
   sealing said tubing to concurrently provide a plurality of sealed, blood-containing, tubing segments.

2. The method of claim 1 comprising mounting said tubing along a longitudinal axis of said tubing locating surface and contacting said tubing at multiple locations of said tubing.

3. A method for providing multiple, sealed, blood-containing tubing segments comprising:
   providing a length of blood-containing tubing;
   mounting said tubing on a tubing locating surface having means for configuring said tubing in a desired configuration, wherein said means comprises a plurality of pins disposed near a longitudinal axis of said surface and slots for lateral movement of said pins, said method further comprising:
   configuring said tubing on said tubing locating surface in a desired configuration after said mounting including placing said tubing between said pins;
   laterally moving said pins across said axis to a position spaced from said axis;
   contacting said tubing at the locations where said tubing intersects said axis; and
   sealing said tubing to concurrently provide a plurality of sealed, blood-containing, tubing segments.

* * * * *